April 13, 1965 J. M. BLACKHALL 3,178,513

TOLL TICKETING TELEPHONE SYSTEM

Filed May 31, 1961 4 Sheets-Sheet 1

INVENTOR.
JAMES M. BLACKHALL
BY C. A. Gulbrandsen
ATTY.

TOLL TICKETING TELEPHONE SYSTEM

Filed May 31. 1961 4 Sheets-Sheet 2

INVENTOR.
JAMES M. BLACKHALL
BY C. A. Gulbrandsen
ATTY.

INVENTOR.
JAMES M. BLACKHALL
BY C. A. Gulbrandsen
ATTY.

TOLL TICKETING TELEPHONE SYSTEM

Filed May 31, 1961

INVENTOR.
JAMES M. BLACKHALL

BY C. A. Gulbrandsen

ATTY.

3,178,513
TOLL TICKETING TELEPHONE SYSTEM

James M. Blackhall, La Grange, Ill., assignor to Automatic Electric Laboratories, Inc., Northlake, Ill., a corporation of Delaware Filed May 31, 1961, Ser. No. 113,724
4 Claims. (Cl. 179—7.1)

Figure 1:
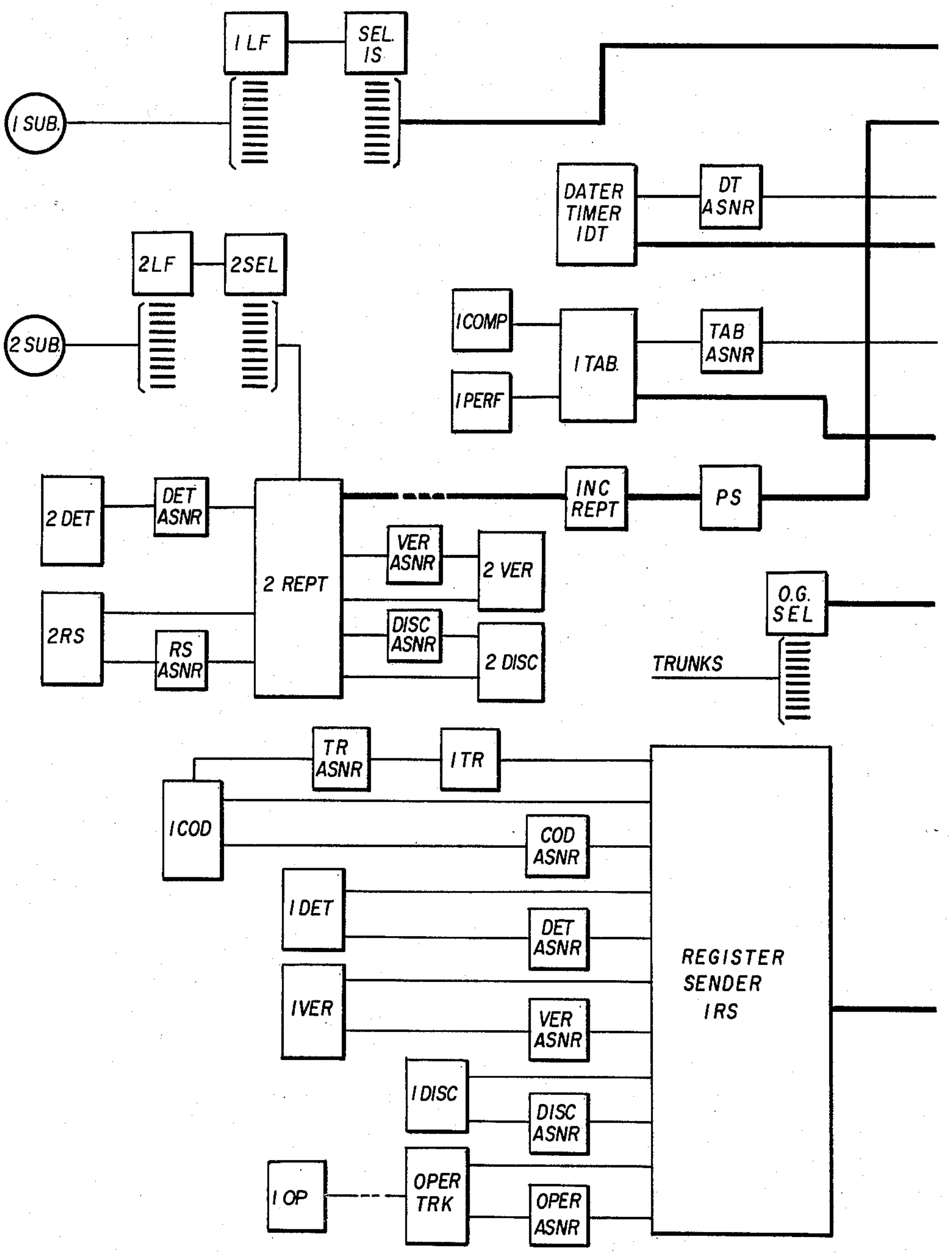

The present invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

With the advance of the toll ticketing art, many types of systems are being manufactured. The principal difference between these automatic toll ticketing systems is the use or non-use of a ticketing access code. The use of this code by the calling subscriber identifies individually charged calls and frees the system from the necessity of automatically making such identification.

This primary difference puts all ticketing systems, of whatever manufacture, into two classes. A first class or "A" system wherein no access code is used, and a second class including "B," "C," and "D" systems.

The latter group are all access code systems which differ in principle only in the means used to identify the calling number.

The "B" system identifies with the calling line detector.

The "C" system identifies with the dial (calling subscriber dialing in his own identity).

The "D" system identifies thru an operator.

It has become apparent that all three of the above services (BCD) can be handled economically by one apparatus. This invention discloses a ticketer which, with an associated register-sender, can be used with any one or a combination of these systems.

Substitution of this ticketer and associated register-sender for existing ticketers and transenders will produce an important overall economy in equipment. The following rough calculation shows the approximate saving:

Let Y equal the present ticketer.
The 3Y/4 equals the present transender.
A typical system at present involving fifty ticketers can be expressed as:

$$50Y+13\times 3Y/4 \text{ or approximately } 60Y$$

The new ticketer is Y/3.
The register-sender is 4Y/3.
This new ticketer does not include apparatus for the accumulation of time.
The register-sender does not include a codexer. Computer equipment equal to Y for yielding elapsed time must be added to the system.
Codexer equipment equal to Y must also be added to the system.
The above typical fifty ticketer system now becomes:

$$50\times Y/3+12\times 4Y/3+Y+Y \text{ or approximately } 35Y$$

The saving is 25Y.

This means that in a fifty ticketer system material equal to *one-half* of the ticketers may be saved by better distribution of the equipment with respect to function and holding time.

The drawings show the relationship of the ticketer and associated register-sender to the remainder of the system.

As is evident from the drawing the ticketers when idle are at all times connected via preselecting rotary switches to available register-senders. The register-sender provides line bridge and stopping battery by which the combination is seized and held during the time required in setting up the connection.

In addition to the pool of register-senders the ticketers have access to pools of dater-timers and tabulators.

All information is taken into the ticketers from register-senders and dater-timers and discharged from the ticketers to tabulators.

No timing of the call is made in the ticketer in order to keep this device as simple as possible. Instead, time of billing in five digit form is stored therein. Time of disconnect is supplied to the tabulator, associated with the ticketer during tabulation, by a dater-timer and subtraction for elapsed time is made in a computer.

With the provision of such a system the quality of service could be economically upgraded by the purchaser, progressing by easy stages from the most economical form of "C" service to complete "B" service as follows.

(1) "C" service only
(2) "C" service and business hour D service
(3) "D" service and B service for heavy toll-users
(4) "B" service only While there may be operating questions concerning such a mixture of services the system will provide all at little cost over any single service.

Accordingly the object of this invention is to provide an improvement of the well known ticketer circuit in which reliable versatile operation is obtained with simplified equipment.

A feature of the invention is the use of a single rotary switch for receiving data for storage, for timing the disconnect and for reading out stored data.

The above mentioned and other objects and features of the invention will be more clearly understood from a consideration of the following description, read in connection with the drawings, in which:

FIG. 1 shows in block diagram form a calling subscriber station, a line finder and selector by which the ticketer is accessed, the auxiliary toll ticketing equipment including a dater-timer and assigner, a tabulator and assigner a computer and perforator associated with the tabulator, an outgoing ticketer selector; a register-sender with its associated circuits including a codexer and assigner, a translator and assigner, a detector and assigner, a verifier and assigner, a discriminator and assigner, an operator trunk and assigner, operator sender and assigner and an operator position for the main exchange. A branch exchange subscriber is also shown along with the branch exchange switching equipment and toll repeater.

Figure 2:
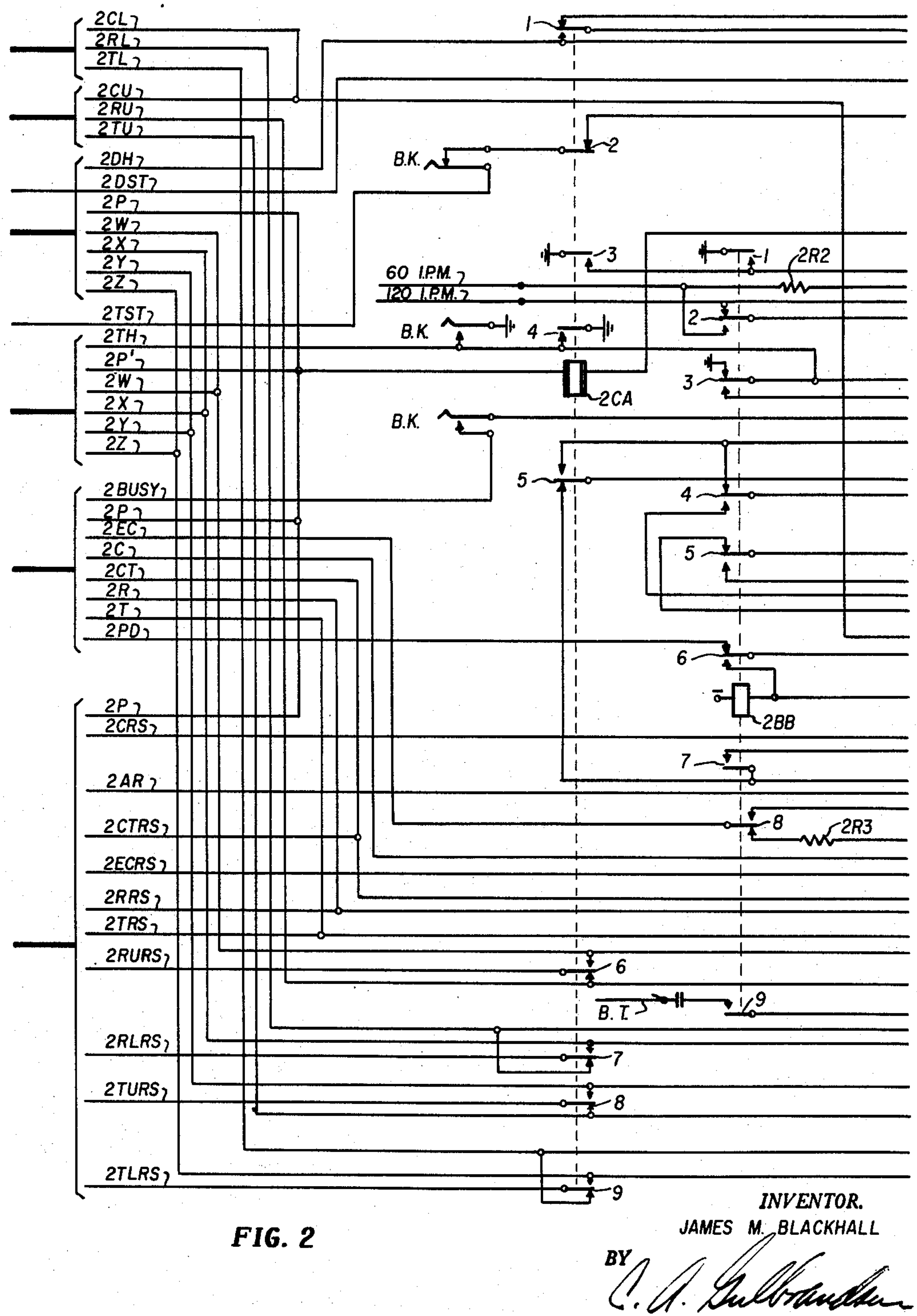
Figure 3:
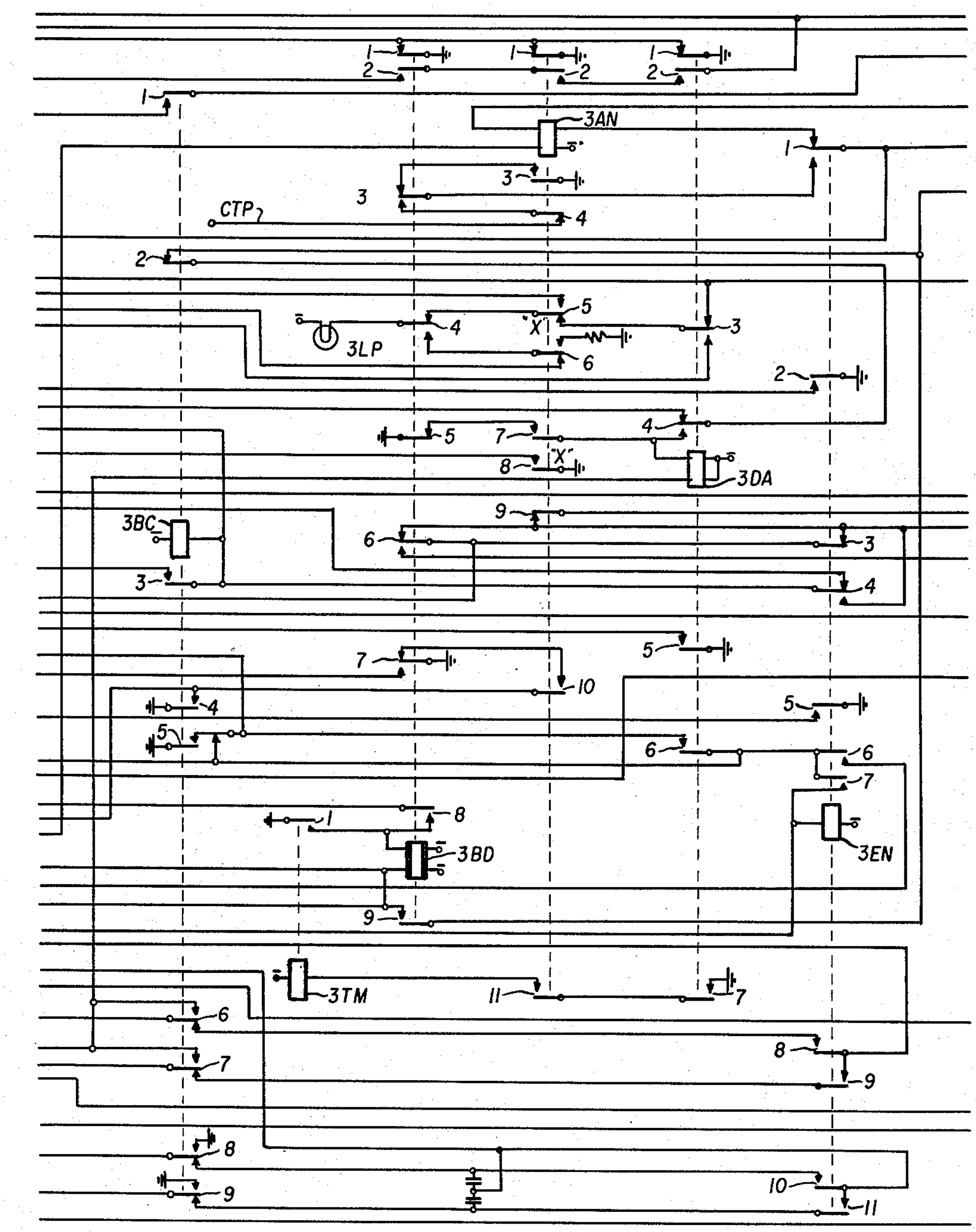
Figure 4:
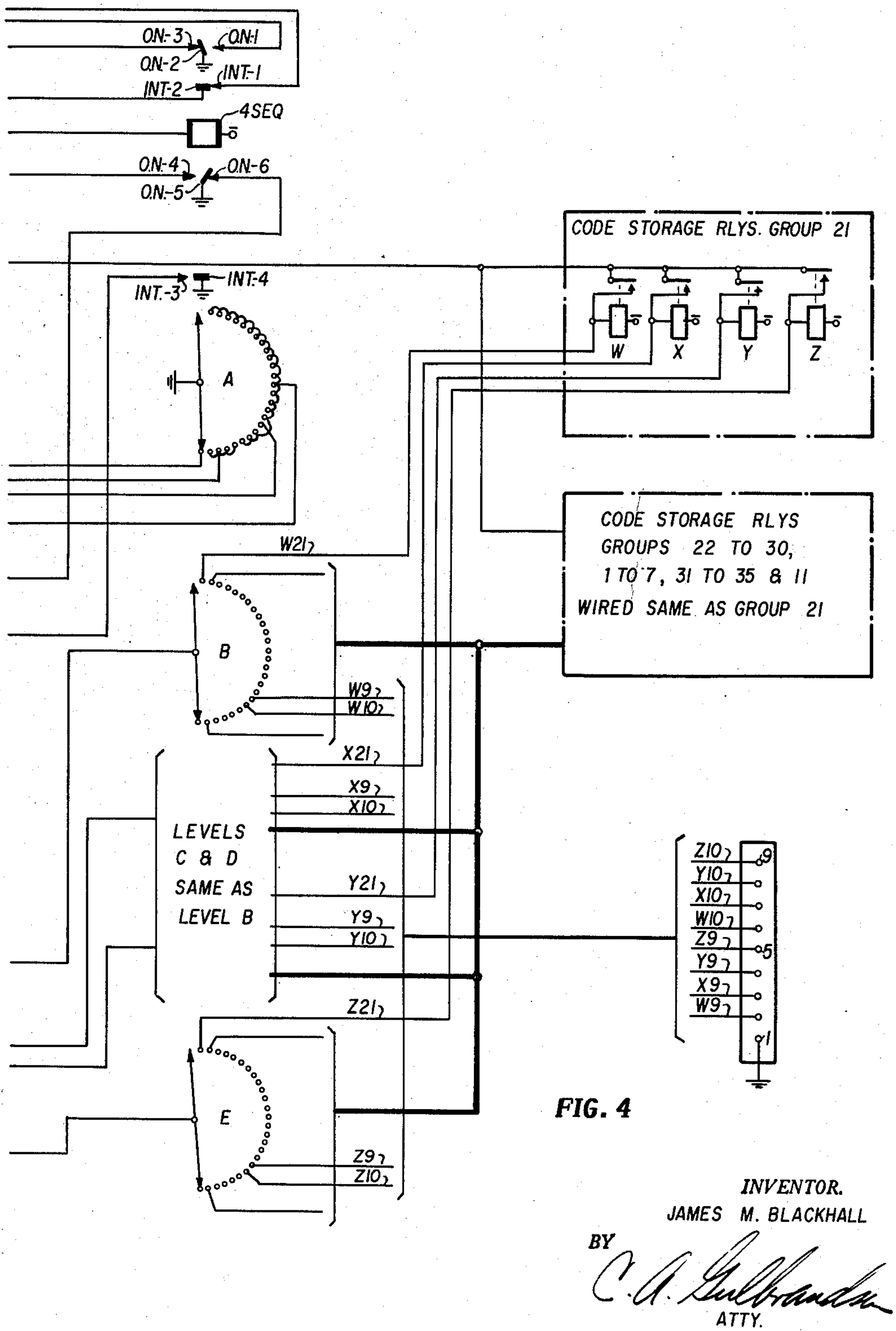

FIGS. 2, 3 and 4 show in schematic form the circuit of the universal ticketer.

GENERAL OPERATION

A typical call from a sub-office subscriber 2SUB thru the ticketing center progresses as follows:

The calling subscriber 2SUB lifts his receiver and dials the ticketing access code and upon seizure of the trunk repeater 2REPT lands immediately on the register-sender 1RS in the ticketing center.

The calling subscriber then dials the terminating numbers 7 or 10 digits. These digits are counted in the trunk repeater 2REPT at the sub-office, the identity of the called party is deposited therein and registered in the register-sender 1RS at the ticketing center.

When the first pulse of the third or sixth digit is sensed in the register-sender 1RS at the ticketing center a codexer 1COD is called upon and the necessary digits for translation sent to it. This codexer may be of the type disclosed in the copending patent application of James M. Blackhall Ser. No. 678,419, filed August 15, 1957. Upon receipt of the digits to be translated the codexer 1COD marks the translator 1TR and a five digit directive together with a control digit to mark the useful digits of the called number are registered on code storage relays in the register-sender 1RS. At this point sending may begin and be carried to a point two digits before the end of the number or to the end of the number.

When the first pulse of the seventh or tenth digit is sensed in the trunk equipment 2REPT at the sub-office a sub-office register-sender 2RS is called upon and when available the detection cycle is started and the originating number is stored therein. The calling line detector may be of the type disclosed in copending patent application of J. E. Ostline Ser. No. 625,833, filed December 3, 1956.

When the dialing of the terminating number has been completed the register-sender 2RS in the sub-office proceeds to send the originating number to the register-sender 1RS in the ticketing center at which point it is stored, provided that this number was one to which the calling subscriber was permitted access as determined by the discriminator 2DISC. This discriminator as well as the calling line number verifier if used may be of the type disclosed in copending application of J. M. Blackhall, Ser. No. 724,355, filed November 27, 1958, now U.S. Patent No. 3,007,007.

If the call is being made from a number which at the option of the telephone company has been given no facilities for "B" service no number will be yielded by the detector 2DET and the register-sender 2RS at the sub-office will release.

At this point the calling subscriber may exercise the option of "C" service and proceed to dial the originating number which will be stored in the ticketing center register-sender 1RS exactly as in a "B" service call.

If no pulses enter the register-sender 1RS at the ticketing center for 2 or 3 seconds after the end of dialing the call is switched to a "D" operator 10P.

The number given by the calling subscriber to a "D" operator distant from the register-senders in the ticketing center is keyed by the operator; into the same type of register-sender used for a sub-office "B" service call such as is disclosed in the copending patent application Ser. No. 650,508 of J. E. Ostline and J. W. Taugner, filed April 3, 1957, the start signal releases the operator and starts the local register-sender 2RS pulsing the number into the register-sender 1RS at the ticketing center.

If the call were from the subscriber 1SUB at the ticketing center the process will remain the same except, that all of the functions mentioned would have been performed by equipment associated with register-sender 1RS rather than 2RS.

Upon receipt of the originating number the sending is started or restarted. Sending is started on the first pulse of the first digit of the originating number if to a common control office and on the first pulse of the second last digit if to a non-common control office.

Upon completion of the sending the register-sender 1RS proceeds to transfer both calling and called numbers, together with a digit representing its own designation, to the associated ticketer and at the end of this process delivers a cut-thru signal to the ticketer and releases.

The ticketer upon cut-thru waits for a flashing or a steady answer indication.

If a flashing signal is returned the ticketer counts a few flashes and disconnects the out trunk, returning busy to the calling subscriber.

If a subscriber answer is returned, the ticketer grace period timer operates and causes the ticketer to take five digits indicative of the time-of-day from a dater-timer.

If the called subscriber hangs up before the calling subscriber the ticketer proceeds to time 20 seconds at the end of which time busy tone is returned to the calling subscriber. If release still does not occur five additional seconds are timed and the calling subscriber is disconnected from the ticketer and tabulation takes place.

Upon release of the connection, either forced or by the calling subscriber, the ticketer proceeds to transmit the ticket data to the tabulator in the conventional manner.

The tabulator calls in a computer to which it transmits simultaneously data for determining elapsed time and if required for dollars and cents charge, which data are in turn transmitted to the perforator and put on the tape record. The tabulator and computer may be of a type similar to that disclosed in Patent No. 2,955,163, granted October 4, 1960 to J. E. Ostline, S. W. Benson and M. H. Esperseth.

DETAILED OPERATION

Upon seizure by a local selector such as 1S via the path including leads 2TL, 2RL and 2CL, relay 2CA is unoperated. Therefore, these leads are switched to leads 2TLRS, 2RLRS at contacts 2CA9 and 2CA7 and through lead 2CRS via back contacts 3BC5 to the register-sender 1RS.

The register-sender 1RS, in response, returns ground potential via lead 2ECRS to operate relay 3BD by its second windings. Relay 3BD operates fully and locks to ground potential from the level A wiper of switch 4SEQ at normal, back contacts 2CA5 and contacts 3BD8 to the winding of relay 3BD.

Relay 3BD upon operating, closes ground potential at contact 3BD7 to the outgoing selector via lead 2PD. At contact 3BD4 interrupted pulses at the rate of 120 i.p.m. are closed to lamp 3LP to indicate that the register-sender has been seized.

The subscriber proceeds with the dialing of the called number. After receipt of the third or sixth digit depending upon the type of call that is being initiated, the register-sender connects with a codexer to which the necessary digits for translation are sent. Upon receipt of the digits to be translated the codexer marks the translator. The translated directive and a control digit to mark the useful digits of the called number are registered in the register-sender. At this point sending is begun and is carried to a point two digits before the end of the number. This is accomplished via leads 2RRS and 2TRS to the ticketer and from there via leads 2R and 2T to the outgoing selector and trunk.

If the call is made from a number which is not arranged for automatic number identification (type B service), no number will be yielded by the detector at the time he has completed the dialing of the called number. At this point the calling subscriber may exercise the option of type "C" service and proceed to dial the originating number which will be stored in the register-sender in the same manner as for type "B" service. If no pulses enter the register-sender for 2 or 3 seconds after the end of dialing the call is switched to a "D" operator. The number given by the calling subscriber to a "D" operator is then pulsed to the register-sender. After receipt of the originating number the sending is restarted and completed.

Upon completion of sending, the register-sender proceeds to transfer both calling and called number, together with a digit representing its own designation, to the ticketer.

This transfer is performed by the register-sender closing a ground potential to lead 2P of the ticketer. This ground potential operates relay 2CA in series with rotary switch magnet 4SEQ. Upon release of rotary switch magnet 4SEQ the wipers of rotary switch 4SEQ are stepped to the first position corresponding to the code storage relay group 21. The operation of relay 2CA closes lead 2RURS via contacts 2CA6 to the level B wipers of switch 4SEQ, lead 2RLRS via contacts 2CA7 to the level C wipers, lead 2TURS via contacts 2CA8 to the level D wipers and lead 2TLRS via contacts 2CA9 to the level E wipers thereby completing a four conductor path to mark the first digit in code to the code storage relays the switch 4SEQ bank. This sequence of operation will continue until the entire area code consisting of three digits, the office code consisting of three digits and the four terminal digits of the called number are stored in the code storage relay groups 21 to 30 inclusive.

The calling station identity is next transferred to the ticketer and stored in code storage relay groups 1 through 7, and the associated register-sender identity in code storage relay group 11.

Prior to the release of the rotary switch 4SEQ magnet for the first step of the wipers, a ground path completed from the level A wiper to relay 3BC via the path make contacts 2CA5, CA–10B, break contact 3BB4, break contacts 3EN4, to the winding of relay 3BC. Relay 3BC upon operating, closes at contacts 3BC4 ground potential to lead 2AR. Relay 3BC upon operating also closes an operating path for relay 3DA via make contacts 3BC7. Relay 3DA then locks up from ground potential at rotary switch 4SEQ, off normal contacts 4 and 5 after switch 4SEQ steps off normal and the make contacts 3DA4 to its second winding Relay 3DA at contacts 3DA1 supplies via contacts 2BB5 and 3BC3 a holding potential for relay 3BC. Relay 3BD releases when the register-sender removes the pulse from lead 2ECRS and the rotary switch 4SEQ takes its first step. Relay 3BC and 3DA are held operated during the transfer process, while relay 2CA and switch 4SEQ are operated for each digit that is transferred to the ticketer storage relays.

Call cut through (*operated relays 2CA, 3BC and 3DA*).—Upon completion of the transfer operation the register-sender forwards a cut through signal by applying ground potential to lead 2CTRS to the ticketer and releases itself from the connection. The ticketer extends this signal to the outgoing selector via lead 2CT. Ground potential on lead 2CTRS operates relay 3EN. Relay 3EN connects outgoing selector lead 2C to incoming selector lead 2CL at contacts 3EN6 and also connects itself to this lead at contacts 3EN7. At contacts 3EN5 an operating path is completed to relay 2BB and at contacts 3EN9 and 3EN11 a speech path is prepared from leads 2RL and 2TL of the incoming selector to leads 2R and 2T of the outgoing selector respectively. Relay 2BB operates, opens the holding circuit to relay 3BC at back contacts 2BB5, connects outgoing selector lead 2EC at contacts 2BB8 to the second winding of relay 3AN. Relay 3BC releases, opens the circuit to relay 3DA at contacts 3BC2 and at back contacts 3BC7 and 3BC9 completes the connection of leads 2RL and 2TL to 2R and 2T respectively. At this point lamp 3LP glows with a steady bright light.

Call abandoned (*operated relays 3EN, 2BB, various code storage relays in groups 1–30 and switch 4SEQ*).—Should the subscriber decide to abandon the call at the present time before answer by the called station, relay 3EN held from the 2CL lead of the incoming selector would be released. The release of relay 3EN in turn would release relay 2BB, at back contacts 3EN1 via the first winding of relay 3AN, 4SEQ interrupter springs 1 and 2, back contacts 2CA1 and 4SEQ off-normal springs 1 and 2 connect rotary switch magnet to ground potential. Switch 4SEQ then steps self interruptedly to its home position. During the homing operation of switch 4SEQ relay 3AN operates partially completing a path at its "X" contacts 3AN5 via resistor 2R2 to lead 60 i.p.m. Lamp 3LP flashes dimly at a rate of 60 interruptions per minute to indicate that the ticketer is releasing. During this release operation relay 3BC will be operated from ground potential at "X" contacts 3AN8 and release upon relay 3AN falling back.

Flashing signal after cut through (*operated relays 3EN, 3BB, various code storage relays of group 1–30 and switch 4SEQ*).—Receipt of a flashing signal from the outgoing selector via lead 2EC results in the operation of relay 3AN through its second winding. Relay 3AN upon operating closes an operate path to relay 3DA at contacts 3AN7, at contacts 3AN11 prepares a circuit to relay 3TM which is completed by relay 3DA at contacts 3DA7 and at contacts 3AN3 via contacts 3BD3 and 3EN1 completes an operating path to rotary switch magnet 4SEQ. Relay 3DA thereafter locks to ground potential from rotary switch off-normal springs 4 and 5 via contacts 3BC2 and 3DA4. Upon termination of the first flash relay 3AN releases followed by the release of relay 3TM and rotary switch 4SEQ takes a step to bank contact 20. This sequence is repeated for the second and third flash after which relay 3BC is operated via make contacts 3EN4, break contacts 3AN9 and ground potential from level A wiper of switch 4SEQ resting on contact 22 to apply busy tone from lead 2BT via make contacts 2BB9 and 3BC7 to lead 2RL. Relay 3BC upon operating also opens the holding circuit to relay 3DA at contacts 3BC2 which in turn opens the holding circuit to relay 3EN at contacts 3DA6. Relay 3EN upon restoring opens the operate circuit of relay 2BB at contacts 3EN5, the holding circuit of relay 3BC at contacts 3EN4 and closes a restoring circuit for rotary switch 4SEQ from ground potential at off-normal springs 1 and 2, back contacts 2CA1, interrupter springs 1 and 2, first winding of relay 3AN, back contacts 3EN1 to the rotary switch 4SEQ. Relay 3BC does not release but is then hold by ground potential from the "X" contacts 3AN8 of relay 3AN which is partially operated from the operate circuit of switch 4SEQ. Rotary switch 4SEQ upon reaching its normal position, no longer pulses relay 3AN in series with itself. Relay 3AN falls back releasing relay 3BC. The code storage relays were released upon relay 2BB releasing and removing ground potential at contacts 2BB1. The circuit is now at normal and ready to accept another call.

Called subscriber answers (*operated relays 3EN, 2BB, switch 4SEQ and various code storage relays*).—When the called subscriber answers relay 3AN is operated by ground potential received over lead 2EC from the outgoing selector to its second winding. Relays 3TM and 3DA and the rotary switch 4SEQ magnet are all operated as described in the preceding section for the first flash of a flash busy indication. Relay 3BD is operated by relay 3TM at contacts 3TM1. Relay 3BD upon operating opens the circuit to the rotary switch 4SEQ motor magnet at back contacts 3BD3 whereby it steps its wipers to contacts number 20, grounds lead 2PD to the outgoing selector for pad control, lights lamp 3LP to steady dim glow, removes ground potential from lead 2DH to the dater timer, connects dater timer assigner lead 2DST to ground via contacts 3BD2, 3AN2, 3DA2, 2CA1 and switch 4SEQ off-normal springs 1 and 2. The marking of leads 2DH and 2DST serves to mark this ticketer to the dater timer assigner and to start the dater timer to send the time of day to the ticketer. This interval of ime during which the time of connection is registered serves as a "grace" period for the timing of the call.

Upon connection with the dater-timer, the dater timer places a pulse on lead 2P to operate rotary switch magnet 4SEQ and release it whereby the wipers of rotary switch 4SEQ are stepped to position 21 corresponding with code storage relay ground 31. The pulse on lead 2P from the dater-timer is followed by the first digit in code via leads 2W, 2X, 2Y and 2Z indicating the time of day. The sequence of a pulse on lead 2P to step rotary switch 4SEQ followed by a code on leads 2W, 2X, 2Y and 2Z will be repeated until the rotary switch steps to the normal position. When rotary switch 4SEQ steps to normal it removes ground potential from off-normal spring 4 thereby releasing relay 3DA. Relay 3DA upon releasing removes the operating potential from relay 3TM which also releases. The circuit then remains in this condition until either party hangs up.

Called subscriber hangs up (*calling subscriber still on the line*), (*operated relays 3AN, 2BB, 3BD, 3EN and various code storage relays*).—Upon the called subscriber hanging up the receiver, relay 3AN held via lead 2EC is released to complete a circuit from lead 2CTP via contacts 3AN4, make contacts 3BD3, make contacts 3EN1 to the motor magnet of rotary switch 4SEQ. The common time pulses on lead 2CTP will operate and release the magnet of rotary switch 4SEQ to keep stepping this switch until position 18 is reached resulting in a timed interval of about 20 seconds within which time the calling subscriber may hang up.

Upon the calling subscriber hanging up relay 3EN is released as holding ground via the 2C lead is removed. A circuit is now completed at contacts 3EN1 to cause rotary switch 4SEQ to step self interruptedly to its home or normal position from ground potential on its off-normal springs 1 and 2. Upon reaching the normal position switch 4SEQ completes a path from ground potential on off normal springs 5 and 6, make contacts 2BB–4B, break contacts 3EN4 to the coil of relay 3BC thereby energizing it. The operation of relay 3BC completes a path to lead 2TST at contacts 3BC7 to start the tabulator assigner hunting for an available tabulator. The operations as the data from the ticketer is transferred to the tabulator is described in a subsequent section.

Should the calling subscriber still remain on the line when switch 4SEQ reaches position 18 a circuit will be completed from ground potential on the level A wiper, contact 18, make contact 3EN4 to operate relay 3BC. Relay 3BC upon operating places busy tone from lead 3BT upon the line conductor back to the calling line. At this same time relay 3DA will be operated from the line loop completed at make contacts 3BC9 and 3BC7.

The calling subscriber will hang up the receiver upon hearing busy tone. This action releases relay 3DA which opens the circuit of relay 3EN at contacts 3DA6 to complete a circuit to step rotary switch 4SEQ to normal. The circuit comprising ground potential from rotary switch 4SEQ off-normal springs 1 and 2, back contacts 2CA1, self-interrupted at rotary switch 4SEQ interrupter springs 1 and 2, the first winding of relay 3AN and the break contacts 3EN1 to the motor magnet of rotary switch 4SEQ. Swith 4SEQ at normal marks lead 2TST, to the tabulator assigner with ground potential from its off-normal springs 2 and 3 to call for an available tabulator. The release of relay 3EN also removes ground potential from lead 2TH to the tabulator at contacts 3EN2 to indicate to it to proceed with the removal of the stored data.

Should the calling subscriber still remain connected after receiving busy tone from the ticketer, switch 4SEQ will continue to step from the time pulses on lead 2CTP until it reaches its normal position. Upon rotary switch 4SEQ reaching normal relay 3BC is released (ground potential of wiper level A removed) to open the circuit of relay 3DA at contacts 3BC2 and 3BC7.

Relay 3EN releases when its holding ground is removed at contacts 3BC5. Relay 3BC reoperates after the release of relay 3EN from ground potential at rotary switch off-normal contacts 5 and 6, make contacts 2BB4, break contacts 3EN4 to the coil of relay 3BC. The operation of relay 3BC marks the tabulator assigner to start hunting for an available tabulator. The operations as the data from the ticketer is transferred to the tabulator is described in the following section.

Transfer of data to tabulator (*operated relays 3AN, 2BB, 3BC, 3BD, 3DA and various code storage relays*).—The tabulator upon receiving a start marking on its lead 2TH impresses a pulse of ground potential on lead 2P to the ticketer. This pulse of ground potential on lead 2P serves to energize the motor magnet of switch 4SEQ in series with relay 2CA. Termination of this pulse steps switch 4SEQ to the first position on its bank whereby marked ones of the code leads 2W, 2X, 2Y and 2Z are extended to the tabulator to transfer the stored data. The process of a pulse on lead 2P followed by a transfer of data via lead 2W, 2X, 2Y and 2Z will continue in the same manner as for the first step until all of the data has been transferred to the tabulator. Switch 4SEQ at normal opens the circuit to relay 3BD which releases relay 2BB at contacts 3BD7. The release of relay 2BB removes the holding ground at contacts 2BB1 for the code storage relays, and they return to normal. Relay 3BC is released and releases relay 3DA, a short time after relay 2CA which was pulsed with magnet 4SEQ releases. Relay 3AN operated only partially is also released when rotary switch 4SEQ steps to normal. The circuit is now at normal and ready to accept another call.

What is claimed is:

1. In an automatic ticketing telephone system, a plurality of subscriber lines including a calling line, switching means, a ticketer, a plurality of register-senders, a ticketer selector, preselector means in said ticketer operated to maintain a register-sender associated therewith during the idle state of said ticketer, means in said ticketer responsive to connection with a register-sender to prepare a first through dial path to said register-sender and a second through dial path to said ticketer selector, said switching means operated from said calling line to extend a connection from said line to said ticketer, and said associated register-sender, a timer, a time pulse source and a tabulator, said register-sender operated to register therein all of the dialed data from said connected calling line via said first through dial path, outpulsing means in said register-sender operated thereafter to outpulse an appropriate directive via said ticketer second through dial path to said ticketer selector, register means in said ticketer, ticketer register conditioning means in said ticketer operated by said register-sender upon completion of outpulsing, said ticketer-register means thereafter operated by said register-sender to register in said ticketer the called and calling station directory numbers and the register-sender identity, said register-sender disconnecting from said ticketer upon completion of the registry in said ticketer, timer access means in said ticketer operated upon receipt of answer supervision to access said timer, said ticketer register conditioning means reoperated upon access to said timer, said ticketer register means thereafter operated by said timer to register therein the time, disconnect relay means in said ticketer operated in response to a disconnect signal from a called party to connect said register conditioning means to said time pulse source, said ticketer register means operated by said time pulses to count a predetermined interval during which a busy tone is sent to the calling party, other means in said ticketer operated upon disconnect of said calling party to access a tabulator, means in said tabulator operated upon access to again operate said register means in said ticketer to remove all of said ticketer stored data.

2. An automatic system as set forth in claim 1 which includes means in said ticketer for maintaining said ticketer marked busy during use thereof.

3. The system defined in claim 1 in which the ticketer includes busy means for providing a busy marking to prevent said ticketer from being seized until said stored data has been transmitted to said tabulator and in which said ticketer includes disconnect means for interrupting said busy means upon completion of the transfer of said stored data.

4. In an automatic ticketing system as claimed in claim 1, including first circuit means including said preselector means operated to force a release of said calling line upon the lapse of said predetermined interval.

References Cited by the Examiner

UNITED STATES PATENTS

| | | | |
|---|---|---|---|
| 2,767,246 | 1/56 | Retallack | 179—7.1 |
| 2,848,543 | 8/58 | Breed et al. | 179—7.1 |
| 2,886,642 | 5/59 | Morris et al. | 179—7.1 |
| 2,894,068 | 7/59 | Morris et al. | 179—7.1 |
| 3,019,295 | 1/62 | Ostline et al. | 179—7.1 |

ROBERT H. ROSE, *Primary Examiner.*

WALTER L. LYNDE, *Examiner.*